United States Patent [19]

Kurata

[11] Patent Number: 4,577,218

[45] Date of Patent: * Mar. 18, 1986

[54] COLOR SEPARATING CIRCUIT FOR PRODUCING RED AND BLACK SIGNALS

[75] Inventor: Masami Kurata, Kanagawa, Japan

[73] Assignee: Fuji Xerox Co., Ltd., Tokyo, Japan

[*] Notice: The portion of the term of this patent subsequent to Oct. 23, 2001 has been disclaimed.

[21] Appl. No.: 476,759

[22] Filed: Mar. 18, 1983

[30] Foreign Application Priority Data

Mar. 19, 1982 [JP] Japan .................................. 57-42555

[51] Int. Cl.[4] .......................... H04N 1/46; G03F 3/08; G01J 3/511; G06K 9/46
[52] U.S. Cl. ...................................... 358/75; 358/80; 356/416; 382/17
[58] Field of Search ............... 358/75, 78, 80; 382/17; 356/406, 416, 425, 402; 250/226

[56] References Cited

U.S. PATENT DOCUMENTS 4,479,242 10/1984 Kurata .................. 358/75

FOREIGN PATENT DOCUMENTS 53-8159 1/1978 Japan ..................................... 358/75

Primary Examiner—Michael A. Masinick
Assistant Examiner—Randall S. Svihla
Attorney, Agent, or Firm—Sughrue, Mion, Zinn Macpeak & Seas

[57] ABSTRACT

A reading device having two different reading elements for scanning the same portion of an original in different wavelength ranges. A color separating circuit comprises a signal level adjusting circuit for adjusting the levels of picture signals provided by the reading elements so that the levels are equal to each other when white picture data is read. An arithmetic unit obtains a level difference between the picture signals which have been subjected to level adjustment by the signal level adjusting circuit. A/D converters are used for digitizing an output signal of the arithmetic unit and the picture signals provided by the reading elements. A color separation logic circuit subjects three different picture signals outputted by the A/D converters to logic operation for color separation.

4 Claims, 6 Drawing Figures

WHITE  RED  BLUE  GREEN  BLACK  YELLOW (a)

(b)

WHITE  RED  BLUE  GREEN  BLACK  YELLOW (a)

(b)

(c)

COLOR SEPARATING CIRCUIT FOR PRODUCING RED AND BLACK SIGNALS

BACKGROUND OF THE INVENTION

This invention relates to a color separating circuit for distinguishing a given color from other colors on an original.

Consider first an original having a white field on which picture data have been recorded in various colors. It is frequently required to distinguish picture data, for instance, in red from the other picture data and to record or display the picture data thus distinguished. In such a case, a color separating circuit is employed in order to distinguish and separate a given color from other colors.

FIG. 1 illustrates one example of a reading device with such a color separating circuit. An original 2 is placed on a transparent flat glass plate, namely, a platen 1 in such a manner that the surface to be read is faced downward. A pair of fluorescent lamps 3 and 4 are arranged below the platen 1 in such a manner that they extend in the main scanning direction (perpendicular from the plane of the sheet). Therefore, the surface of the original 2 being read is exposed to a narrow band of light.

A light beam 5 reflected from the orignal 2 is split into two light beams $5_1$ and $5_2$ by a halfmirror 6. The light beam $5_1$, which has passed through the half-mirror 6, forms the image on a first image sensor 8 with the aid of a first lens 7. On the other hand, the light beam $5_2$, which has been reflected by the half-mirror 6, is converged by a lens 9 and is subjected to wavelength selection by a filter 11, thus forming the image on a second image sensor 12. When the reading device distinguishes a color, for example, red from the other colors, a cyan filter, the color of which is complementary with red, is employed as the filter 11.

FIG. 2 indicates the levels of picture signals provided by the two image sensors of the reading device. More specifically, the waveform (a) of FIG. 2 shows the picture signal provided by the image sensor 8 in FIG. 1, while the waveform (b) of FIG. 2 shows the picture signal provided by the image sensor 12. These picture signals, after being digitized with threshold levels $l_1$ and $l_2$ indicated by the dotted lines, are supplied to a color separating circuit.

FIG. 3 shows a conventional color separating circuit. A signal 16 which is obtained by digitizing the output picture signal of the first image sensor 8 (hereinafter referred to as "a white binary signal 16", when applicable) is applied to a first input terminal 15 of the color separating circuit. Similarly, a signal 18 is obtained by digitizing the output picture signal of the second image sensor 12 (hereinafter referred to as "a complementary color binary signal 18", when applicable) to a second input terminal 17. The white binary signal 16 is applied unaltered to a first output terminal 19 and to one input terminal of a 2-input NAND circuit 21. The complementary binary signal 18 is applied through an inverter 22 to the other input terminal of the NAND circuit 21. The output of the NAND circuit 21 is applied to a second output terminal 23. The circuit is designed so that, when a signal "0" is provided at the first output terminal 19, the input picture data is judged to be black, and that, when a signal "0" is provided at the second output terminal 23, the input picture data is judged to be red.

When white picture data is applied to the color separating circuit, signals "1" are provided at the first and second output terminals 19 and 23, respectively. That is, in this case, the circuit recognizes the picture data to be white. When red picture data is applied to the circuit, a signal "1" is provided at the first output terminal 19, while a signal "0" is provided at the second output terminal 23. In this case, the circuit determines the data to be red. When blue, green or black picture data is inputted to the color separating circuit, a signal "0" is provided at the first output terminal 19 while a signal "1" is provided at the second output terminal 23. In this case, the circuit recognizes the data to be black. Thus, the circuit can satisfactorily separate red from other colors, such as white, blue, green and black.

However, the color separating circuit sometimes recognizes a color which is clearly different from the particular color to be distinguished from other colors. For instance, when yellow picture data as shown in FIG. 2 is inputted to the above-described color separating circuit for red separation, the signals "1" and "0" are provided at the first and second output terminals 19 and 23 in FIG. 1, respectively. This is the same result as that in the case where red picture data is inputted. Of course, the yellow picture data may be recognized to be white by decreasing the threshold level $l_2$ in waveform (b) of FIG. 2. However, when the threshold level $l_2$ is lowered, light red may be judged to be white. This is not preferable, because the red picture data which should be printed in red ink is therefore not printed.

SUMMARY OF INVENTION

In view of the foregoing deficiencies in the prior art, an object of this invention is to provide a color separating circuit in which a particular color can be positively distinguished from other colors.

It is another object of this invention to provide a color separating circuit that does not require expensive circuitry to thereby minimize overall system cost.

The color separating circuit according to the invention comprises: a level adjusting circuit for setting the level of a picture signal outputted by a reading element with no filter equal to the level of a picture signal outputted by a reading element with a filter with respect to a white portion of the original. An arithmetic unit subtracts the picture signal which is outputted by the reading element having the filter and subjected to level adjustment by the level adjusting circuit from the picture signal which is outputted by the reading element having no filter and subjected to level adjustment by the level adjusting circuit.

Analog to Digital (A/D) converters are employed for digitizing the result of subtraction of the arithmetic unit and the picture signals outputted by the two reading elements. A color separation logic circuit performs a color separation logic operation according to the three output signals of the A/D converters circuits. In the color separating circuit, the level of the signal resulting from the subtraction is distributed both in the positive direction and in the negative direction, and therefore, the digitizing operation can be achieved in a stable manner. Thus, the above-described objects of the invention are accomplished by the provision of the color separating circuit thus arranged.

This invention will be described in greater detail by reference to the drawing and the description of the preferred embodiment that follows.

BRIEF DESCRIPTION OF THE DRAWINGS

More specifically.

DESCRIPTION OF THE PREFERRED EMBODIMENT

This invention will now be described in detail with reference to its preferred embodiment.

Figure 1:
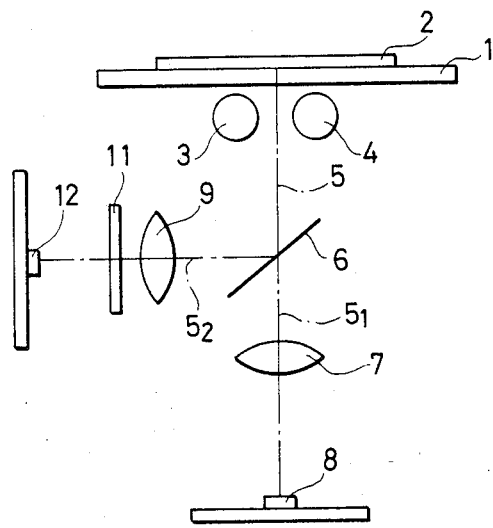
FIG. 1 is an explanatory diagram outlining the arrangement of a reading mechanism in a reading device which performs two-color separation.
Figure 4:
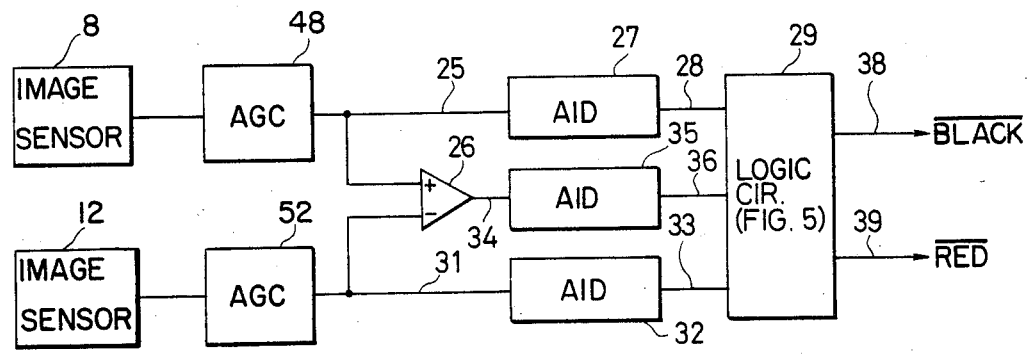
FIG. 4 is a block diagram of a color separating circuit according to the preferred embodiment of the invention.

FIG. 4 illustrates a color separating circuit according to the preferred embodiment of the invention. An analog picture signal 25 is outputted by a first image sensor 8 (FIG. 1) and is subjected to signal level adjustment by AGC 48. The analog picture signal 25 is applied to one input terminal (+) of an arithmetic unit 26, and to a first A/D converter 27, where it is converted into a white binary signal 28 which is applied to a color separation logic circuit 29. An analog picture signal 31 is outputted by a second image sensor 12 (FIG. 1) and is subjected to signal level adjustment by AGC 52. The signal 31 is applied to the other input terminal (−) of the arithmetic unit 26, and to a second A/D converter 32, where it is converted into a complementary color binary signal 33 which is supplied to the color separation logic circuit 29. In the arithmetic unit 26, which is a differential amplifier, the difference between the two analog picture signals 25 and 31 is calculated and is outputted as an arithmetic value signal 34. The signal 34 is digitized by a third A/D converter 35 into an arithmetic value binary signal 36 which is applied to the color separation logic circuit 29. The color separation logic circuit 29 performs a logic operation with respect to the three different binary signals, and outputs a black signal 38 for recording or displaying in black with the signal "0" and a red signal 39 for recording or displaying in red with the signal "0".

Figure 5:
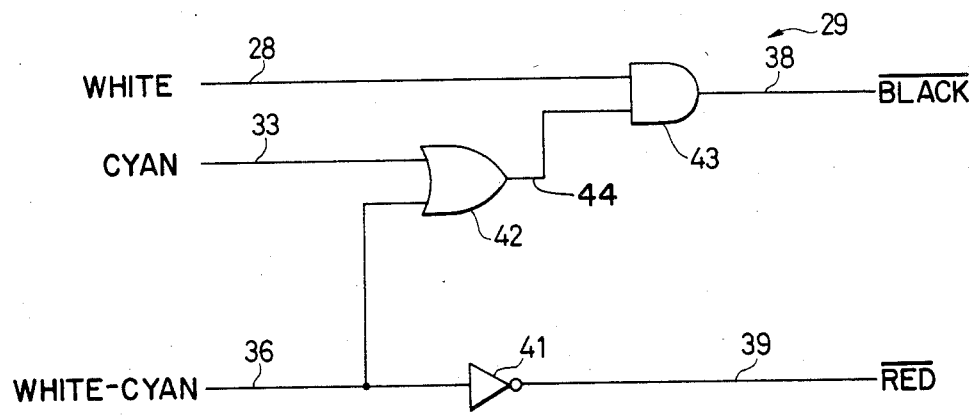
FIG. 5 is a block diagram showing one example of a color separation logic circuit in the color separating circuit in FIG. 4.

FIG. 5 shows an example of the color separation logic circuit 29 of FIG. 4. The circuit has an inverter 41 for inverting the logical level of the arithmetic value binary signal 36. The output signal of the inverter 41 is the red signal 39. The complementary color binary signal 33 and the arithmetic value binary signal 36 are ORed by an OR circuit 42. The output signal 44 of the OR circuit 42 and the white binary signal 28 are ANDed by an AND circuit 43. The output signal of the AND circuit 43 is the black signal 38.

Consider now the case where only red is separated from other colors with the reading device which has the above-described color separating circuit. In this case, a cyan filter, the color of which is complementary with red, is arranged before the second image sensor 12. In the reading device, the output picture signals of the first and second image sensors 8 and 12 are subjected to level adjustment by AGC (automatic gain control) circuit 48 and AGC circuit 52, respectively, so that the signal levels of white picture data are equal to each other.

Figure 6:
FIG. 6 is a waveform diagram showing two signals inputted to the color separating circuit and an output signal of an arithmetic unit with the corresponding threshold levels.
Figure 6:
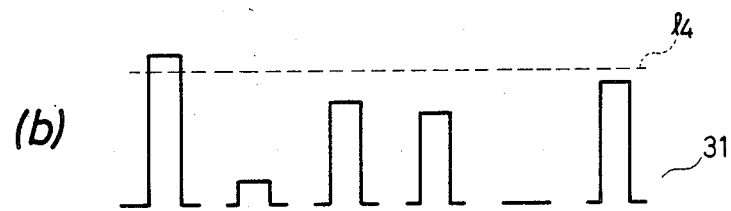
Figure 6:
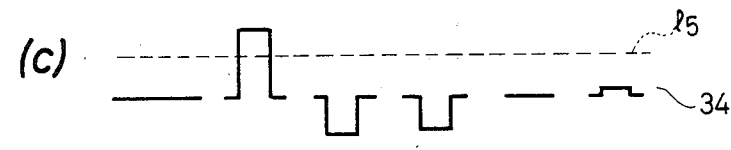

In the two different analog picture signals 25 and 31 thus provided, the signal levels of various colors are as indicated in waveforms (a) and (b) of FIG. 6. The first digitizing circuit 27 sets a threshold level $l_3$ as illustrated, to convert the analog picture signal 25 into a binary signal. In this operation, the threshold level $l_3$ should not be higher than the signal levels of white and red and should not be lower than the signal levels of blue and green. If the threshold level is higher than the signal levels of white and red, these colors may sometimes be judged to be black. If the threshold level is lower than the signal levels of blue and green, sometimes these colors may be recognized to be white.

On the other hand, the second A/D converter 32 operates to set a threshold level $l_4$ as shown. The threshold level $l_4$ should be lower than the signal level of white and higher than the signal level of red in order to perform color separation.

Figure 2:
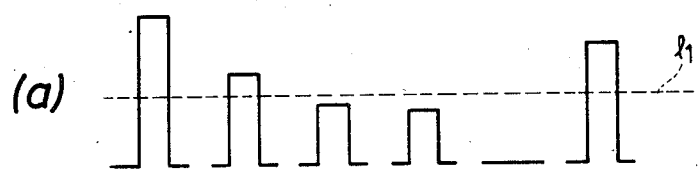
FIG. 2 illustrates waveform diagrams showing the relationships between the output signals of image sensors and the corresponding threshold levels in a conventional color separating circuit.
Figure 2:
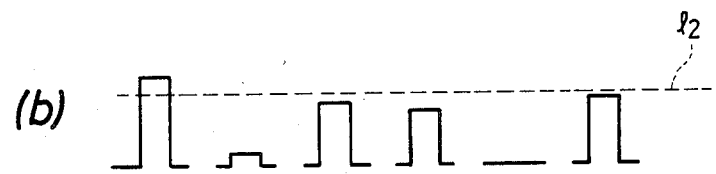
Figure 3:
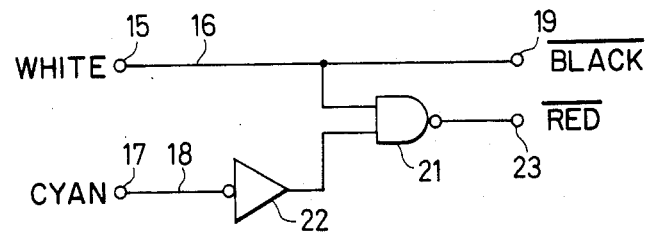
FIG. 3 is a block diagram of a conventional color separation logic circuit.

In the arithmetic unit 26, the signal level of one analog picture signal 31 is subtracted from the signal level of the other analog picture signal 25, and an arithmetic value signal 34 as shown in waveform (c) of FIG. 6 is outputted. In the arithmetic value signal 34, the signal level is zero with a neutral color, such as white or black. The red picture signal is obtained by subtracting the analog picture signal 31 (from which most of the red component has been removed by the cyan filter from the other analog picture signal 25. Therefore, the red signal appears in the positive direction to some extent. The blue and green output levels of the image sensor 8 are substantially equal to those of the image sensor 12 (FIG. 2). However, the arithmetic results of these colors are negative in signal level, because the arithmetic operation is carried out after the signal level of the analog picture signal 31 has been relatively amplified. The signal level of yellow is positive when a red wavelength component is larger, while it is negative when a blue-green or green wavelength component is larger, because the red wavelength component acts in the positive direction and the blue-green or green wavelength component acts in the negative direction. In both cases, the signal level is reduced. Accordingly, the threshold level $l_5$ (waveform (c) of FIG. 6) which is set by the third A/D converter 35, can be set considerably lower than the red signal level.

When the device reads yellow picture data, only the white binary signal 28 is raised to the level "1" and the remaining binary signals 33 and 36 are set to the level "0". In this case, the black signal 38 is set to the level "0", and the red signal 39 is raised to the level "1". Thus, recording or displaying in black is carried out.

As is apparent from the above description, according to the invention, the level difference between the two different analog picture signals which have been subjected to level adjustment is obtained, and the picture signal of each color (the signal level of which is classified positive or negative) is digitized. Color separation is then positively carried out, and a given color can be distinguished from the other colors. Furthermore, according to the invention, after the level difference between the picture signals is obtained, digitizing is carried out. Accordingly, in the method of the invention, unlike the conventional method, one threshold level is set for each signal. Thus, the invention is advantageous in that the circuitry is simple.

It is apparent that modifications of this invention may be practiced without departing from the essential novelty of the invention.

I claim:

1. A color separating circuit system comprising: a reading device having at least two reading elements for scanning the same portion of an original having picture data in different wavelength ranges, and for providing an unfiltered output picture signal and a filtered output picture signal;

signal level adjusting means for adjusting the levels of said output picture signals provided by said reading elements so that said levels are equal to each other when white picture data is read;

arithmetic means for obtaining an output difference signal by computing a level difference between said output picture signals which have been subjected to level adjustment by said signal level adjusting means;

A/D converters for digitizing respectively said output difference signal of said arithmetic means and said adjusted output picture signals provided by said signal level adjusting means; and a color separation logic circuit for performing the operation of color separation on the outputs of said A/D converters.

2. The color separating circuit system of claim 1, wherein said output picture signals are analog signals and wherein said signal level adjusting means comprises an automatic gain control circuit for adjusting the analog output levels of each of said reading elements so that each of said levels are equal to each other when white picture data is read by said reading elements.

3. The color separating circuit system of claim 1, wherein said arithmetic means comprises a differential amplifier producing said output difference signal.

4. The color separating circuit system of claim 1, wherein said color separation logic circuit comprises an inverter for receiving and inverting the digitized output difference signal from said A/D converter digitizing the output of said arithmetic means to produce a first logic output; and OR circuit for receiving said digitized output difference signal and the digitized level-adjusted filtered output picture signal; and an AND circuit for receiving the output of said OR circuit and the digitized level-adjusted unfiltered output picture signal to produce a second logic output; wherein said first logic output indicates that red is to be recorded or displayed; and wherein said second logic output indicates that black is to be recorded or displayed.

* * * * *